United States Patent
Ishikawa et al.

(10) Patent No.: US 11,591,025 B2
(45) Date of Patent: Feb. 28, 2023

(54) FRONT VEHICLE-BODY STRUCTURE OF VEHICLE

(71) Applicant: MAZDA MOTOR CORPORATION, Hiroshima (JP)

(72) Inventors: Yasushi Ishikawa, Hiroshima (JP); Yuichi Morita, Hiroshima (JP); Yusuke Desaki, Hiroshima (JP); Yusuke Matsumura, Hiroshima (JP); Ken Fujimoto, Hiroshima (JP); Yusaku Yamaguchi, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 1 day.

(21) Appl. No.: 17/379,263

(22) Filed: Jul. 19, 2021

(65) Prior Publication Data

US 2022/0041216 A1    Feb. 10, 2022

(30) Foreign Application Priority Data

Aug. 6, 2020  (JP) .............................. JP2020-133807

(51) Int. Cl.
| | |
|---|---|
| *B62D 25/08* | (2006.01) |
| *B62D 25/04* | (2006.01) |
| *B62D 21/15* | (2006.01) |
| *B62D 25/12* | (2006.01) |

(52) U.S. Cl.
CPC ........... *B62D 21/152* (2013.01); *B62D 25/04* (2013.01); *B62D 25/08* (2013.01); *B62D 25/081* (2013.01); *B62D 25/12* (2013.01)

(58) Field of Classification Search
CPC ...... B62D 25/04; B62D 25/08; B62D 25/081; B62D 21/152

USPC ............ 296/193.06, 203.01, 203.02, 193.09, 296/187.09, 187.1
See application file for complete search history.

(56) References Cited

U.S. PATENT DOCUMENTS

| | | | |
|---|---|---|---|
| 8,651,563 B2 * | 2/2014 | Mildner ................. | B62D 25/14 296/203.02 |
| 10,293,859 B2 * | 5/2019 | Kiyoshita ............ | B62D 21/157 |

FOREIGN PATENT DOCUMENTS

| | | | | |
|---|---|---|---|---|
| JP | 2017128224 A | * | 7/2017 | ........... B62D 21/152 |
| JP | 2018-135080 A | | 8/2018 | |

* cited by examiner

*Primary Examiner* — Dennis H Pedder
(74) *Attorney, Agent, or Firm* — Studebaker & Brackett PC

(57) ABSTRACT

A front vehicle-body structure controls inward breakage of an apron reinforcement in the event of a small overlap collision, without increasing weight. Embodiments include a pair of right and left apron reinforcements extending in a vehicle front-rear direction; and a pair of right and left hinge pillars respectively connected to rear ends of the pair of apron reinforcements. A reinforcement outer member of the apron reinforcement includes a linear portion extending in the vehicle front-rear direction from a rear end of the apron reinforcement connected to the hinge pillar to an intermediate portion of the apron reinforcement. A horizontal bead, provided as a deformation facilitating portion to facilitate deformation toward an inside of a vehicle body, is disposed on an outer surface portion positioned on a vehicle-width-direction outer side of the linear portion, the horizontal bead having a reduced longitudinal rigidity toward a front side in the vehicle front-rear direction.

17 Claims, 13 Drawing Sheets

--Prior Art--

--Prior Art--

FRONT VEHICLE-BODY STRUCTURE OF VEHICLE

TECHNICAL FIELD

The present disclosure relates to a front vehicle-body structure of a vehicle, including a pair of right and left hinge pillars respectively connected to rear ends of a pair of right and left apron reinforcements extending in a vehicle front-rear direction.

BACKGROUND

A front vehicle-body structure of a vehicle has been known that includes a pair of right and left apron reinforcements extending in the vehicle front-rear direction and a pair of right and left hinge pillars respectively connected to rear ends of the pair of apron reinforcements. Also, in order to ensure safety of an occupant space in the event of an obstacle colliding with a portion of the vehicle on a vehicle-width-direction outer side relative to its front side frame (overlap region of not more than 25%), or a so-called small overlap collision, which is exemplified by small overlap rigid barrier (SORB) tests, a method has been known that causes an apron reinforcement to undergo inward breakage deformation toward a vehicle-width-direction inner side to thereby absorb collision energy.

For example, a front vehicle-body structure of a vehicle disclosed in Japanese Patent Laid-Open No. 2018-135080 includes: a pair of right and left apron members (apron reinforcements) extending in the vehicle front-rear direction and constituting a closed cross-section; a pair of right and left hinge pillars respectively connected to rear ends of the pair of apron members; a front reinforcement provided on the vehicle-width-direction outer side within the closed cross-section; a rear reinforcement provided outside the closed cross-section at a position overlapping the front reinforcement in side view and connected to a joined portion between the apron member and the hinge pillar. The front reinforcement and the rear reinforcement are joined together via the apron member.

A wheel may be increased in diameter to improve designability and motion performance of the vehicle. Increasing the diameter of the wheel typically involves increase in tire width and increase in contact area between a road surface and the tire. This leads to increase in grip performance and cornering performance of the tire. In such a case where the wheel is increased in diameter, a wheel well is modified to widen toward the vehicle-width-direction outer side in order to accommodate a tire whose width is widened along with the increase in diameter of the wheel.

SUMMARY

As shown in the bottom view of FIG. 24A, an apron reinforcement 100 is disposed on the vehicle-width-direction outer side of a front side frame 120 with a suspension tower 110 positioned therebetween. An outer surface portion 101 constituting a vehicle-width-direction outer side wall of the apron reinforcement 100 is configured to shift to the vehicle-width-direction inner side as it goes toward the front side. Hence, in the event of a small overlap collision, the apron reinforcement 100 is controlled to undergo inward breakage deformation toward the vehicle-width-direction inner side around a connecting portion between the apron reinforcement 100 and a hinge pillar 130, as shown in the bottom view of FIG. 24B. Note that reference numeral 140 denotes a barrier that collides with the vehicle. However, in the case where the apron reinforcement 100 is modified along with the increase in diameter of the wheel or other reasons, there may be concern that the apron reinforcement 100 cannot undergo inward breakage deformation in the event of a small overlap collision.

In the case where the wheel well is widened toward the vehicle-width-direction outer side, along with such widening of the wheel well, the apron reinforcement 100 is composed of a linear portion 100A in which the outer surface portion 101 extends substantially perpendicularly to the vehicle width direction, and a curved portion 100B curved from a front end of the linear portion 100A toward the vehicle-width-direction inner side, as shown in the bottom view of FIG. 25A. Hence, in the event of a small overlap collision, the linear portion 100A of the apron reinforcement 100 remains uncrushed due to it being formed substantially linearly, as shown in the bottom view of FIG. 25B. As such, the apron reinforcement 100 does not undergo inward breakage deformation around the connecting portion between the apron reinforcement 100 and the hinge pillar 130.

That is, the linear portion 100A of the apron reinforcement 100 does not break inwardly but retracts so as to rearwardly displace the connecting portion with the hinge pillar 130. While it is possible to restrain such rearward displacement of the hinge pillar 130 by increasing the plate thickness or adding a reinforcement member to increase the rigidity of the hinge pillar 130, such measures would lead to increase in vehicle body weight and resultant decrease in fuel efficiency. Hence, it is not easy to control the inward breakage of the apron reinforcement in the event of a small overlap collision, without causing weight increase.

The present disclosure provides a front vehicle-body structure of a vehicle and the like that can control inward breakage of the apron reinforcement in the event of a small overlap collision, without causing weight increase of the vehicle body.

A front vehicle-body structure of a vehicle according to the present disclosure includes a pair of right and left apron reinforcements extending in a vehicle front-rear direction; and a pair of right and left hinge pillars respectively connected to rear ends of the pair of apron reinforcements, and is characterized in that the apron reinforcement includes a linear portion extending linearly in the vehicle front-rear direction from a rear end of the apron reinforcement connected to the hinge pillar to an intermediate portion of the apron reinforcement, and a deformation facilitating portion to facilitate deformation toward an inside of a vehicle body is provided on an outer surface portion positioned on a vehicle-width-direction outer side of the linear portion, the deformation facilitating portion having a reduced longitudinal rigidity toward a front side in the vehicle front-rear direction.

In this front vehicle-body structure of a vehicle, the apron reinforcement includes a linear portion extending linearly in the vehicle front-rear direction from a rear end of the apron reinforcement connected to the hinge pillar to an intermediate portion of the apron reinforcement. Consequently, the wheel well can be widened to the vehicle-width-direction outer side, and a large diameter wheel can be mounted. On the outer surface portion positioned on the vehicle-width-direction outer side of the linear portion, the deformation facilitating portion to facilitate deformation toward the inside of the vehicle body is provided, the deformation facilitating portion having a reduced longitudinal rigidity toward the front side in the vehicle front-rear direction. This allows stress to concentrate on the connecting portion between the apron reinforcement and the hinge pillar in the event of a small overlap collision without needing to increase the plate thickness of the hinge pillar or adding a reinforcement member, and the apron reinforcement can be controlled to break inward to the vehicle-width-direction inner side.

In certain embodiments, the deformation facilitating portion includes a horizontal bead extending in the vehicle front-rear direction, and the horizontal bead is configured such that a cross-section thereof reduces toward the front side in the vehicle front-rear direction and a cross-sectional center of gravity thereof shifts to the vehicle-width-direction inner side as the center of gravity goes toward the front side in the vehicle front-rear direction. This configuration allows stress to be transmitted to the connecting portion between the apron reinforcement and the hinge pillar without requiring an additional member and without causing buckling of the outer surface portion of the apron reinforcement that involves out-of-plane deformation. Additionally, in passing the stress rearward through the apron reinforcement, stress components that go toward the vehicle-width-direction inner side can be generated.

In certain embodiments, the deformation facilitating portion includes a vertical bead extending in an up-down direction from an intermediate portion in the vehicle front-rear direction of the horizontal bead and protruding toward the vehicle-width-direction outer side. By concentrating the stress passing rearward through the apron reinforcement on the vertical bead, this configuration can actively increase the stress components that act on the apron reinforcement and go toward the vehicle-width-direction inner side.

In certain embodiments, the apron reinforcement includes, on an upper end thereof, a hinge bracket for fixing a bonnet hinge, and the vertical bead extends upward from an upper end of the horizontal bead to a position near a front end of the hinge bracket. This configuration can increase the stress components that act on the apron reinforcement and go toward the vehicle-width-direction inner side, while restraining downward buckling of the region near the front end of the hinge bracket.

In certain embodiments, the hinge pillar includes a hinge pillar outer member disposed on the vehicle-width-direction outer side and a hinge pillar inner member forming, jointly with the hinge pillar outer member, a closed cross-section extending in an up-down direction, the hinge pillar inner member includes a body having a surface substantially perpendicular to a vehicle width direction and a distal end located frontward of the body and joined to the apron reinforcement and the body, and a fragile portion is disposed at a position near a connecting portion between the body and the distal end. This configuration can facilitate inward breakage deformation of the outer surface portion from the vehicle-width-direction inner side by permitting deformation toward the vehicle-width-direction inner side while ensuring mounting rigidity of the apron reinforcement via the distal end.

In certain embodiments, the fragile portion is created by a strength difference between the material strength of the body and the material strength of the distal end. This configuration can form the fragile portion by the material strength difference between the body and the distal end.

In certain embodiments, the distal end includes a protrusion at a position frontward of the fragile portion in the vehicle front-rear direction, the protrusion protruding toward a vehicle-width-direction inner side. By using deformation of the protrusion, this configuration can induce the fragile portion to bend toward the vehicle-width-direction inner side in the event of a small overlap collision.

Other embodiments include a cowl side reinforcement connected to the hinge pillar outer member and the apron reinforcement, and an up-down direction bead is provided at a front end of the cowl side reinforcement, the up-down direction bead protruding toward a vehicle-width-direction inner side and extending in the up-down direction. This configuration can cause the stress passing rearward through the apron reinforcement to act over a wide range in the up-down direction via the up-down direction bead, facilitating inward breakage deformation of the outer surface portion toward the vehicle-width-direction inner side.

The front vehicle-body structure of a vehicle of the present disclosure is provided with the deformation facilitating portion that induces deformation of the outer surface portion toward the inside of the vehicle body, and thus can cause inward breakage deformation of the apron reinforcement in the event of a small overlap collision, without causing weight increase.

BRIEF DESCRIPTION OF THE DRAWINGS

FIG. 24A illustrates a state before a collision, and FIG. 24B illustrates a state after a collision.

FIG. 25A illustrates a state before a collision, and FIG. 25B illustrates a state after a collision.

DETAILED DESCRIPTION

Hereinafter, a detailed description will be given of embodiments of the present disclosure with reference to drawings. While the following description illustrates the present disclosure as being applied to a front vehicle-body structure of a vehicle, this is merely exemplary and not intended to limit the present disclosure, its application, or uses.

Figure 1:
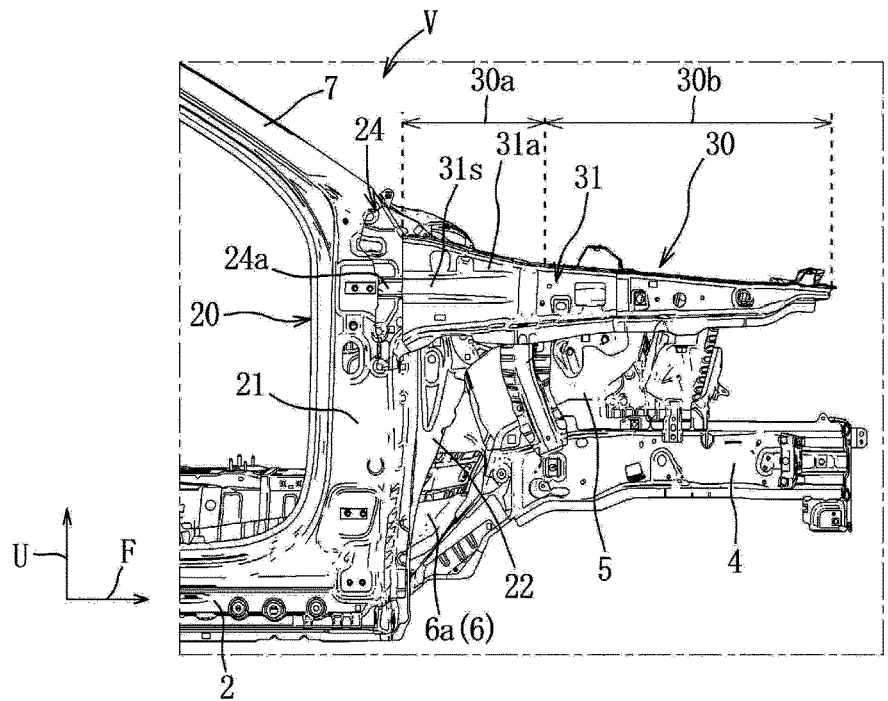
FIG. 1 is a right side view of a front vehicle-body structure of a vehicle according to a first embodiment of the present disclosure.
Figure 2:
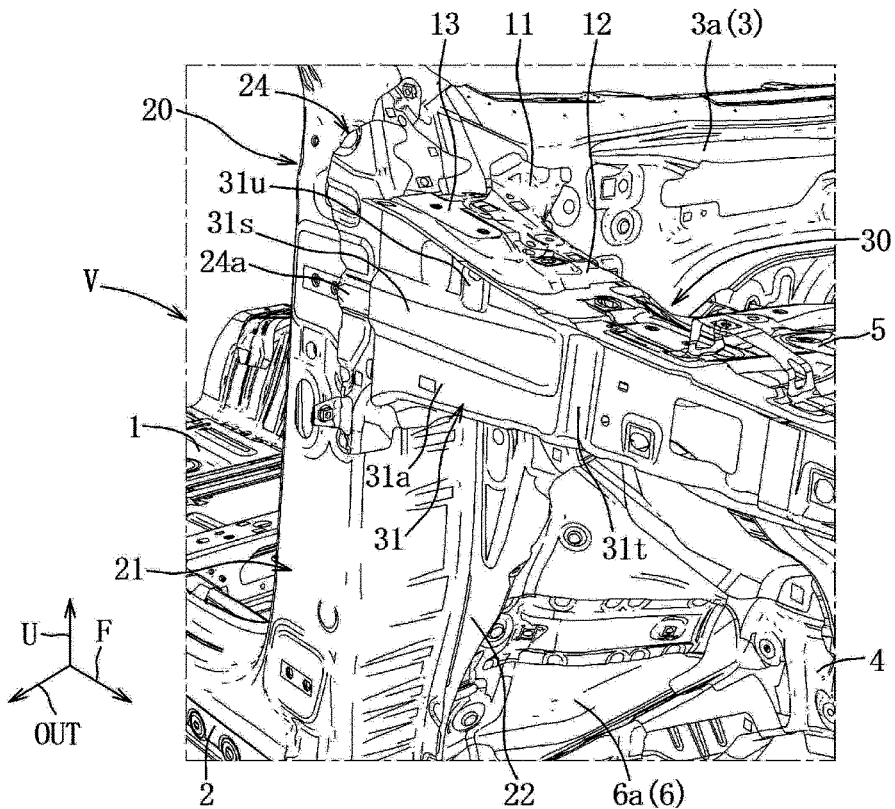
FIG. 2. is a perspective view of vehicle-body portions shown in FIG. 1 when they are viewed from above on the vehicle-width-direction outer side.

A first embodiment of the present disclosure will be described based on FIGS. 1 through 23. As shown in FIGS. 1 and 2, a vehicle V includes: a floor panel 1 constituting a vehicle cabin floor; a pair of right and left side sills 2 extending back and forth; a dash panel 3 providing partition between an engine room (not shown) formed in a front portion of a vehicle body and a vehicle cabin; a pair of right and left front side frames 4 extending frontward from the dash panel 3; a pair of right and left hinge pillars 20 extending vertically upward from respective front ends of the pair of side sills 2; and a pair of right and left apron reinforcements 30 extending frontward from respective upper ends of the pair of hinge pillars 20.

The vehicle V is provided with an inward breakage deformation mechanism that causes the apron reinforcement 30 to undergo inward breakage deformation toward the vehicle-width-direction inner side without causing its buckling involving out-of-plane deformation, in the event of an obstacle colliding with a portion of the vehicle V on the vehicle-width-direction outer side relative to the front side frame 4 (overlap region of not more than 25%), or a so-called small overlap collision, which is exemplified by small overlap rigid barrier (SORB) tests. The inward breakage deformation mechanism has an inner inward breakage inducing function that induces deformation of the apron reinforcement 30 from an inner side of the apron reinforcement 30, and an outer inward breakage inducing function that induces deformation of the apron reinforcement 30 from an outer side of the apron reinforcement 30. As the vehicle V is symmetric in structure, the below description focuses on the right part of the vehicle V. In the figures, an arrow F direction indicates forward in the vehicle front-rear direction, an arrow OUT direction indicates outward in the vehicle width direction, and an arrow U direction indicates upward in a vehicle up-down direction.

First, an overall structure of the vehicle V will be described. The side sills 2 are provided so as to extend back and forth along respective ends in the vehicle width direction of the floor panel 1. Each side sill 2 includes a side sill outer (not shown) with a cross-section of a substantially hat-shaped profile that opens on the vehicle-width-direction inner side and a side sill inner (not shown) with a cross-section of a substantially hat-shaped profile that opens on the vehicle-width-direction outer side. Flange portions of the side sill outer and the side sill inner are joined to form a closed cross-section that extends back and forth.

As shown in FIG. 2, the dash panel 3 is disposed so as to extend in the vehicle width direction between the pair of hinge pillars 20. The dash panel 3 includes a dash lower panel (not shown) that stands upward from a front end of the floor panel 1, and a dash upper panel 3a joined to an upper end of the dash lower panel. A cowl inner panel (not shown) extending in the vehicle width direction is joined to a rear end of the dash upper panel 3a, and a cowl outer panel (not shown) extending in the vehicle width direction is joined to a front side of the cowl inner panel.

The pair of front side frames 4 are disposed between the pair of side sills 2 in plan view. A suspension tower (hereinafter referred to as a "sus-tower") 5 that supports a damper of a front wheel suspension (not shown) is formed between the front side frame 4 and the apron reinforcement 30. The sus-tower 5 integrally includes a wheel well 6 that accommodates a front wheel and the front wheel suspension. The wheel well 6 is formed in a region frontward of the dash panel 3 and below the apron reinforcement 30.

The wheel well 6 includes a wheel well inner 6a formed partially in a bowl shape and disposed outside of a pillar inner member 22 (described later) of the hinge pillar 20, and a wheel well outer (not shown) formed partially in a bowl shape and disposed inside of the pillar inner member 22. The wheel well inner 6a is joined to the front side frame 4 and the pillar inner member 22, and the wheel well outer is joined to the pillar inner member 22 and a lower portion of the apron reinforcement 30.

Now a description will be given of the pair of hinge pillars 20. As shown in FIGS. 1 to 7, each hinge pillar 20 includes a pillar outer member 21 with a cross-section of a substantially hat-shaped profile and a plate-shaped pillar inner member 22 that forms, jointly with the pillar outer member 21, a substantially rectangular closed cross-section extending upward. The pillar outer member 21 and the pillar inner member 22 are composed of high tensile strength steel or ultrahigh tensile strength steel. The pillar outer member 21 is composed of a body 21a with a substantially squared U-shape cross-section and a pair of front and rear flange portions 21b that extend frontward and rearward respectively from a front end and a rear end of the body 21a. The body 21a is formed, at its upper and lower parts, with a pair of upper and lower hinge mounting portions for mounting of door hinges. The hinge mounting portions bulge toward the vehicle-width-direction outer side.

Figure 12:
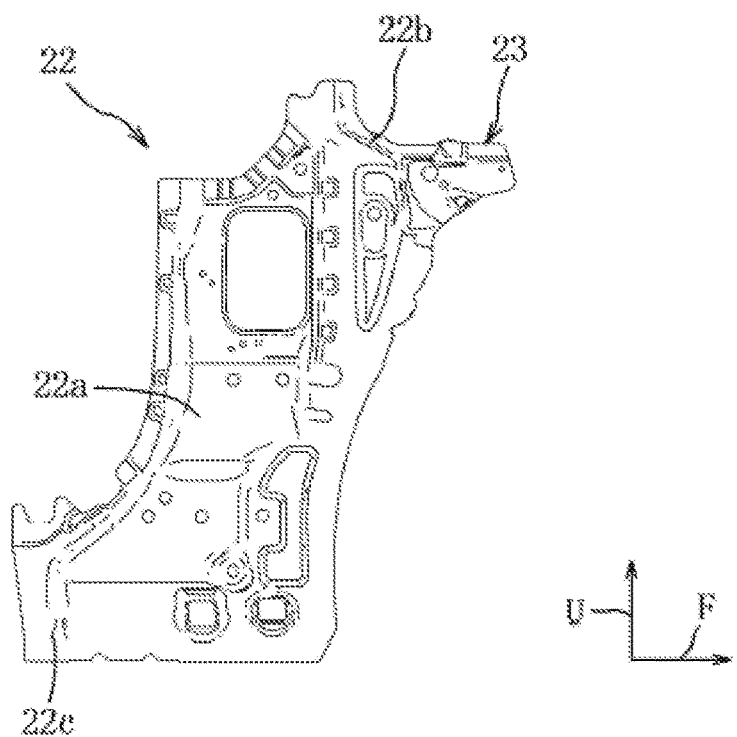
FIG. 12 is a side view of a hinge pillar inner member.
Figure 13:
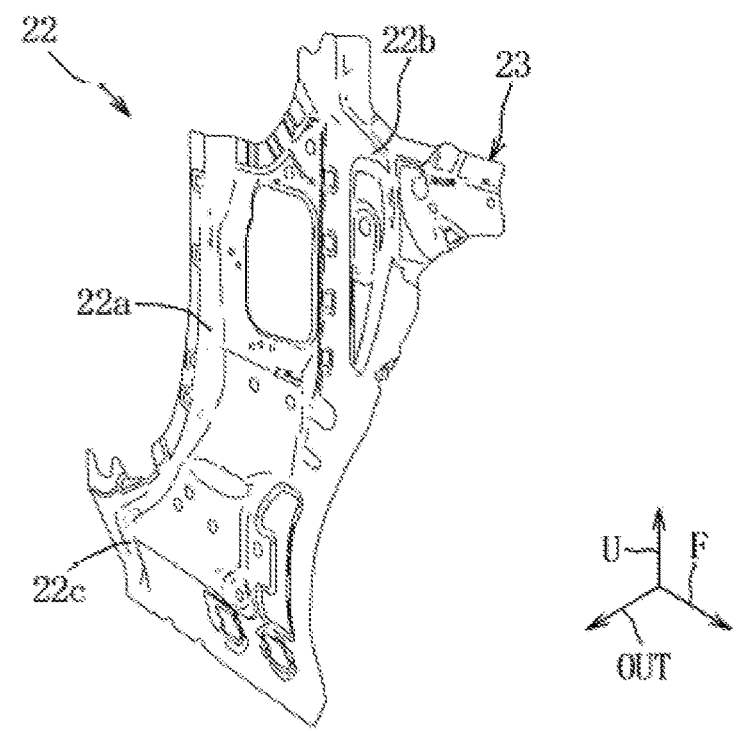
FIG. 13 is a perspective view of the hinge pillar inner member.

The pillar inner member 22 has the inner inward breakage inducing function. As shown in FIGS. 12 and 13, the pillar inner member 22 includes a body 22a that forms a substantially cuboid closed cross-section jointly with the body 21a, an upper extended portion 22b that extends frontward from an upper end of the body 22a, and a lower extended portion 22c that extends rearward from a lower end of the body 22a. The pair of front and rear flange portions 21b of the pillar outer member 21 are joined respectively to front and rear portions of the body 22a by spot welding. The side sill outer and the side sill inner are joined with the lower extended portion 22c interposed therebetween. Thus, the closed cross-section of the side sill 2 is divided by the lower extended portion 22c into a vehicle-width direction inner part and a vehicle-width direction outer part.

Figure 14:
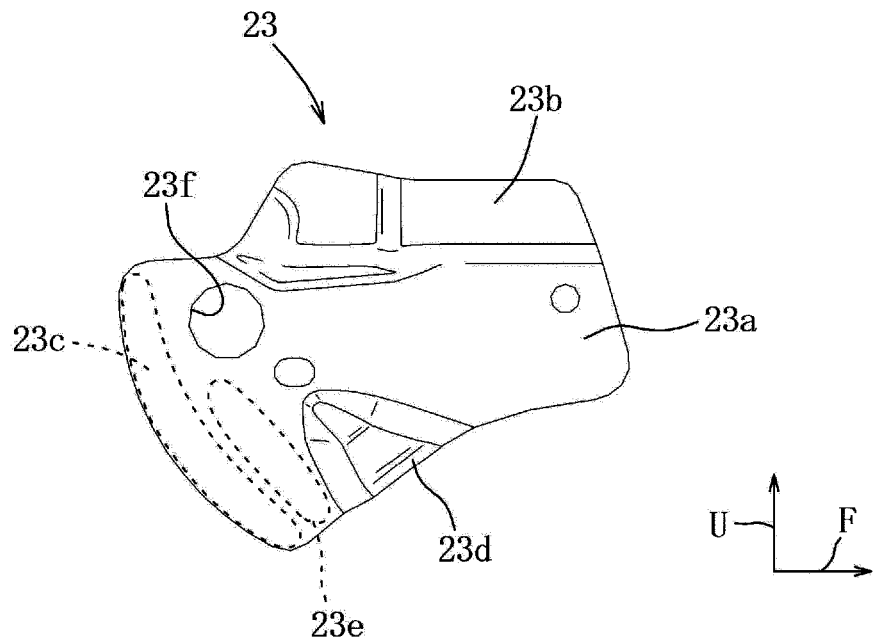
FIG. 14 is a side view of a distal end member.
Figure 15:
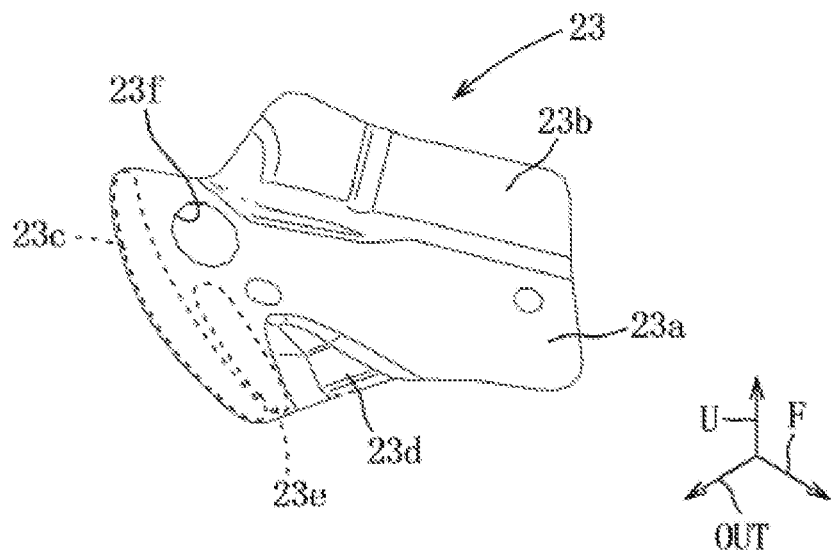
FIG. 15 is a perspective view of the distal end member.

The upper extended portion 22b is formed in a substantially triangular shape in side view. A distal end member 23 (distal end) is mounted on a front end of the upper extended portion 22b. For example, the distal end member 23 has substantially the same plate thickness as the pillar inner member 22 and is composed of high tensile steel. As shown in FIGS. 14 and 15, the distal end member 23 includes a body 23a of a substantially trapezoidal shape in side view and a joined portion 23b bent from an upper end of the body 23a toward the vehicle-width-direction inner side. The joined portion 23b is joined to a lower wall 31c (described later) of the apron reinforcement 30 by spot welding. The joining strength between the joined portion 23b and the apron reinforcement 30 is set higher than the buckling strength of a fragile portion 23e and a protrusion 23d.

The body 23a includes a connecting portion 23c that is positioned in a rear portion of the body 23a and joined to the front end of the upper extended portion 22b by spot welding, the protrusion 23d that is positioned in a front lower portion of the body 23a and protrudes toward the vehicle-width-direction inner side, and the fragile portion 23e that is positioned rearward of the protrusion 23d and frontward of the connecting portion 23c. The buckling strength of these fragile portion 23e and protrusion 23d is set lower than the joining strength of the joined portion 23b. The protrusion 23d is composed of a triangular bead defined by an open bottom and two ridges. Specifically, a rear ridge is disposed substantially parallel to the connecting portion 23c formed in a front downward inclined shape, and a front ridge is disposed substantially parallel to the horizontally formed joined portion 23b.

An opening 23f that is intended to reduce weight and rigidity is formed in an area near an intersection of the front and rear ridges, or in a so-called area of proximity between the joined portion 23b and the connecting portion 23c. Either a single opening 23f or more than one opening 23f may be formed. The distal end member 23 is configured to have lower tensile strength than that of the pillar inner member 22 and a reinforcement outer member 31. The tensile strength of the reinforcement outer member 31 is set lower than that of the pillar inner member 22.

Figure 16:
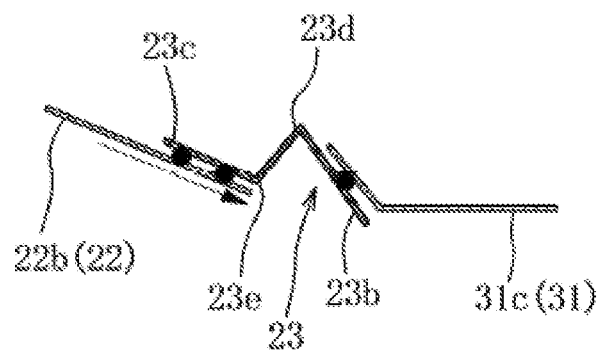
FIG. 16 explains deformation of the distal end member.
Figure 17:
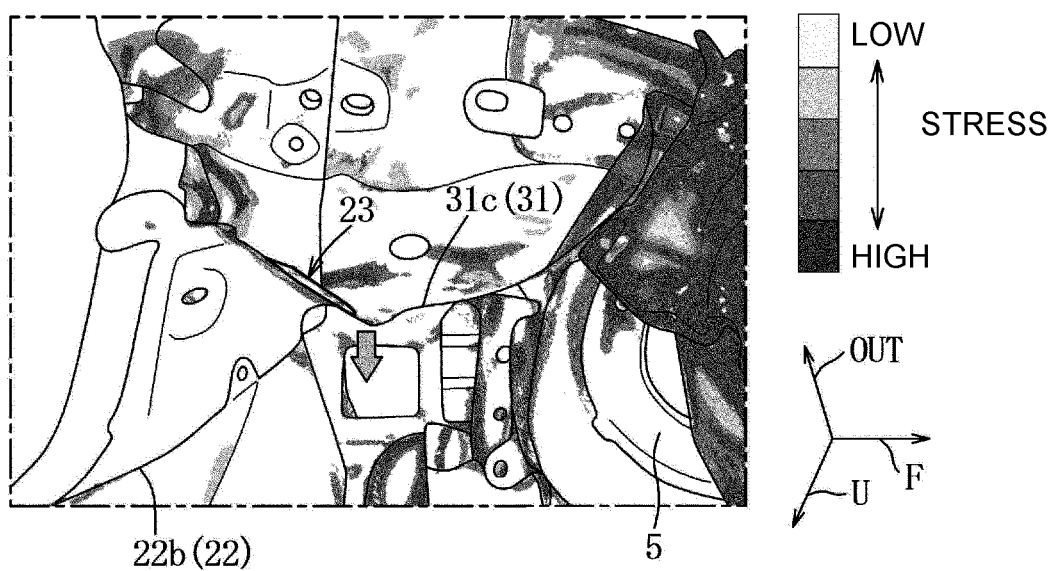
FIG. 17 illustrates the hinge pillar inner member and the distal end member during their deformation.

As shown in FIG. 16, when a rearward collision load acts on the apron reinforcement 30 (the reinforcement outer member 31) in the event of a small overlap collision, the ridges corresponding to the two edges of the protrusion 23d are divided, and due to the opening 23f being formed, transmitted stress concentrates on a center portion of the protrusion 23d and thus inward buckling occurs that causes the center portion to break toward the vehicle-width-direction inner side. Since the pillar inner member 22 has higher tensile strength than that of the distal end member 23, in synchronization with the inward buckling of the center portion of the protrusion 23d, outward buckling occurs in a region corresponding to the fragile portion 23e, causing the region to break toward the vehicle-width-direction outer side. Since the buckling strength of the fragile portion 23e and the protrusion 23d is set lower than the joining strength of the joined portion 23b, the buckling of the fragile portion 23e and the protrusion 23d can take place earlier than breakage of the joined portion 23b.

The posture of the joined portion 23b is changed by the buckling of the fragile portion 23e and the protrusion 23d. By changing the posture of the joined portion 23b using the buckling of the fragile portion 23e and the protrusion 23d, stress acting on the joined portion 23b is converted from shear stress into compressive stress, which further restrains breakage of the joint between the apron reinforcement 30 and the pillar inner member 22. Thus, the distal end member 23 converts a part of stress passing rearward through the apron reinforcement 30 into a component that goes toward the vehicle-width-direction inner side and pushes the upper extended portion 22b toward the vehicle-width-direction inner side (induces inward breakage of the upper extended portion 22b), as indicated by an arrow in FIG. 17.

Figure 3:
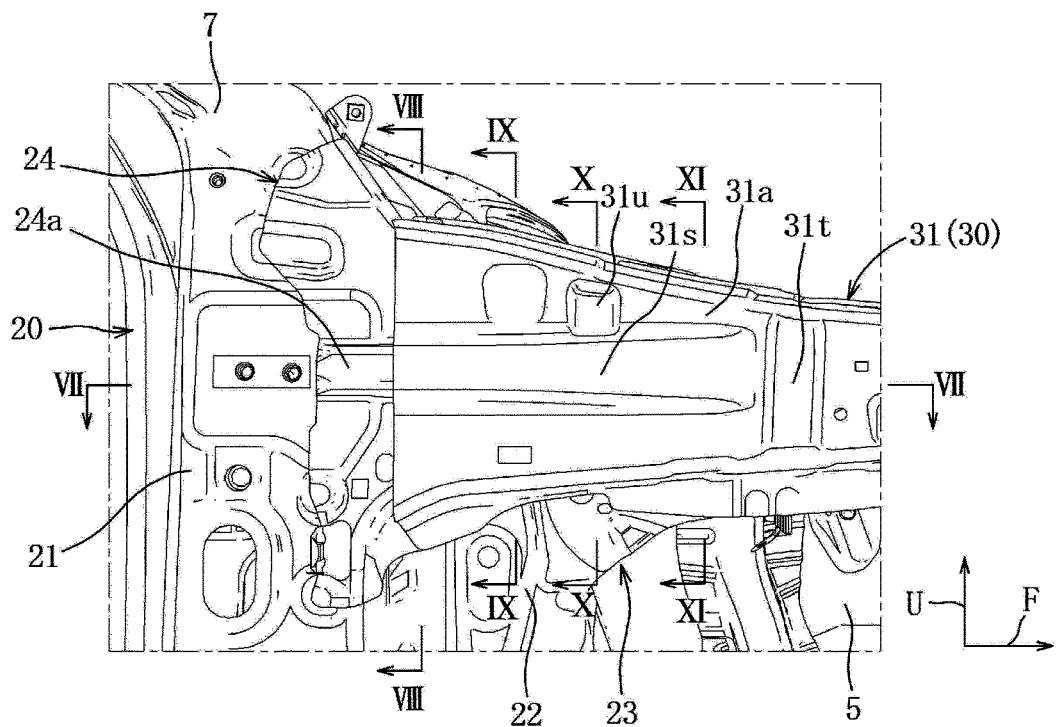
FIG. 3 is an enlarged view of major parts in FIG. 1.

The apron reinforcement 30 will be described below. As shown in FIGS. 1 to 3, the apron reinforcement 30 includes a linear portion 30a that extends frontward from a connecting portion with the hinge pillar 20 and a curved portion 30b that extends downward and toward the vehicle-width-direction inner side from a front end of the linear portion 30a. Thus, the wheel well 6 that can accommodate a widened tire is formed below the apron reinforcement 30 (linear portion 30a).

As shown in FIGS. 7 to 11, the apron reinforcement 30 includes an apron reinforcement outer member (hereinafter abbreviated as a "reinforcement outer member") 31 that extends from a front end of the hinge pillar 20 to a front end of the vehicle V and an apron reinforcement inner member (hereinafter abbreviated as a "reinforcement inner member") 32 that extends from an intermediate portion of the reinforcement outer member 31 to the front end of the vehicle V. The reinforcement inner member 32 of a substantially L-shaped cross-sectional shape is provided so as to correspond to a front-half portion of the reinforcement outer member 31 and forms, jointly with the reinforcement outer member 31, a substantially rectangular closed cross-section extending back and forth. Specifically, a rear-half portion of the reinforcement outer member 31 forms the linear portion 30a, and the front-half portion of the reinforcement outer member 31 and the reinforcement inner member 32 form the curved portion 30b constituting the closed cross-section.

Figure 18:
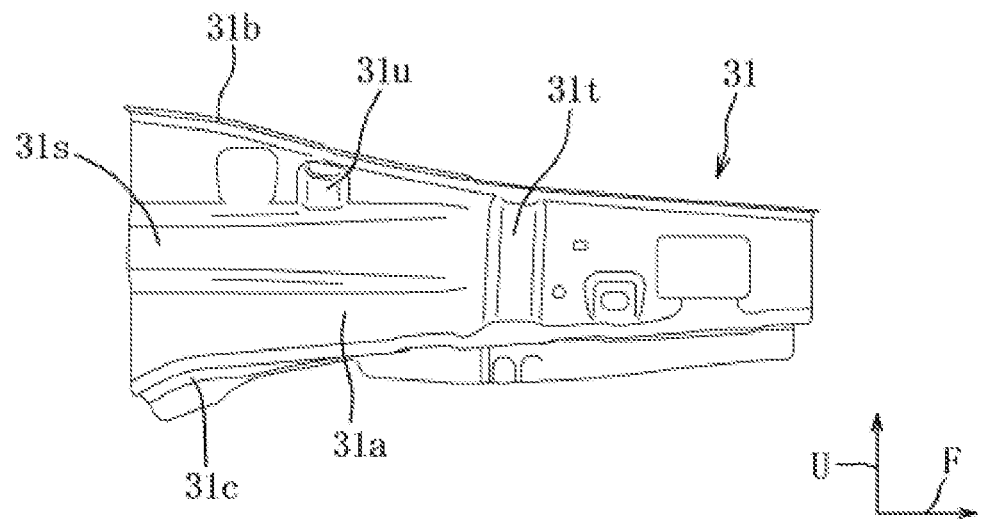
FIG. 18 is a side view of a reinforcement outer member.
Figure 19:
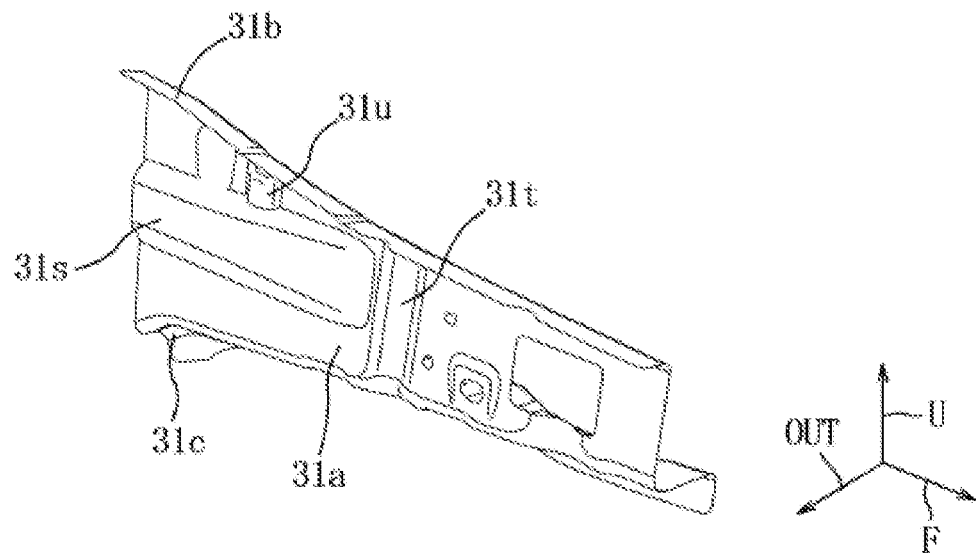
FIG. 19 is a perspective view of the reinforcement outer member.

The reinforcement outer member 31 has the outer inward breakage inducing function. As shown in FIGS. 18 and 19, the reinforcement outer member 31 includes an outer surface portion 31a being a surface substantially perpendicular to the vehicle width direction, an upper wall 31b extending from an upper end of the outer surface portion 31a toward the vehicle-width-direction outer side, and a lower wall 31c extending from a lower end of the outer surface portion 31a toward the vehicle-width-direction inner side. A portion of the outer surface portion 31a corresponding to the linear portion 30a is provided with a horizontal bead 31s, a first vertical bead 31t, and a second vertical bead 31u.

Figure 8:
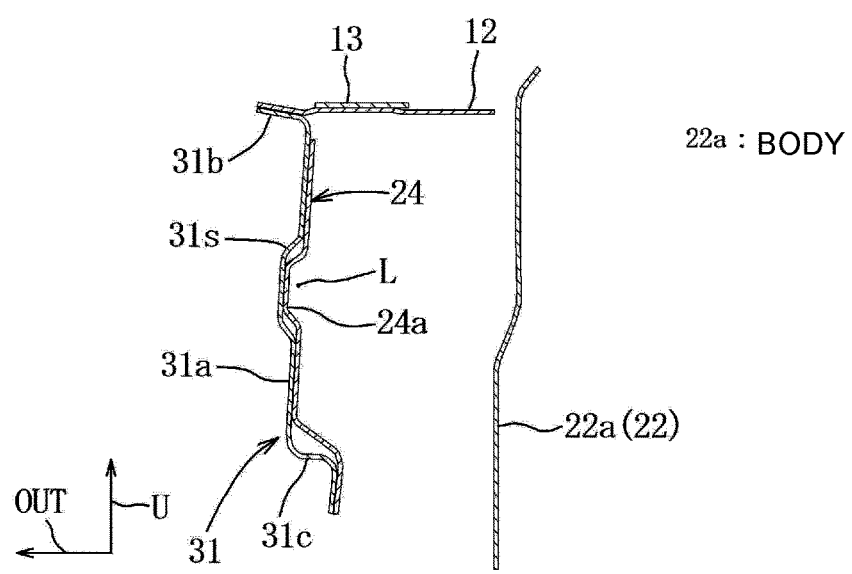
FIG. 8 is a sectional view taken along a line VIII-VIII in FIG. 3.
Figure 9:
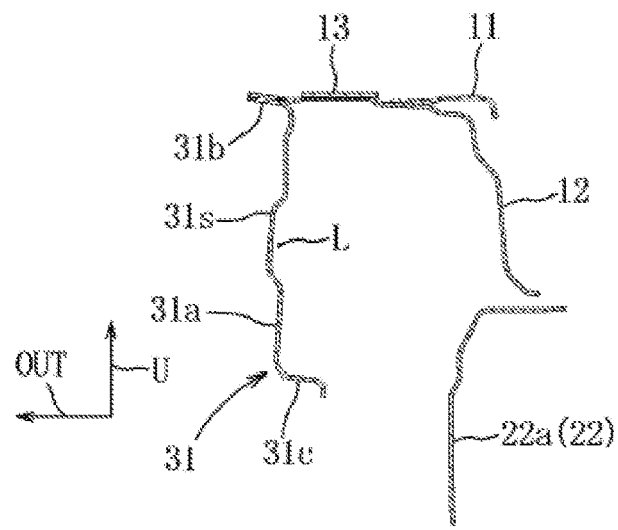
FIG. 9 is a sectional view taken along a line IX-IX in FIG. 3.
Figure 10:
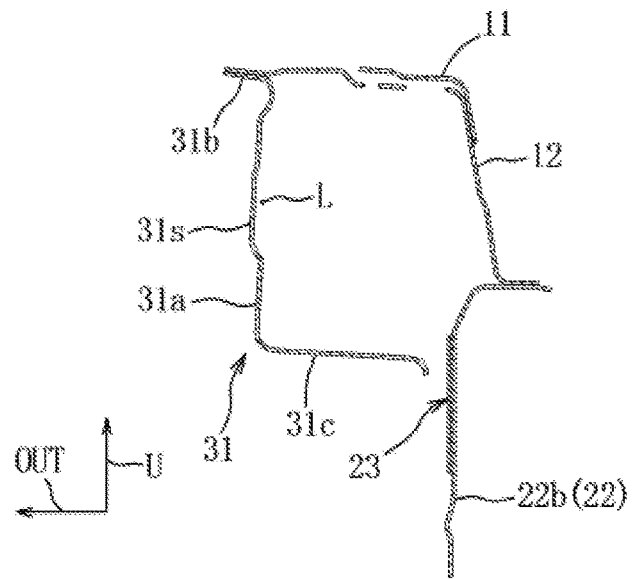
FIG. 10 is a sectional view taken along a line X-X in FIG. 3.
Figure 11:
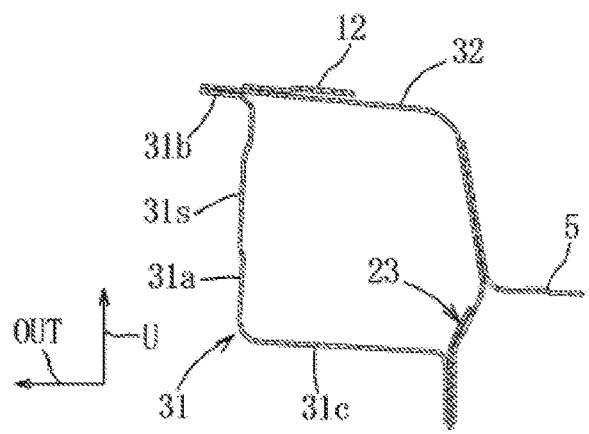
FIG. 11 is a sectional view taken along a line XI-XI in FIG. 3.

The horizontal bead 31s protruding toward the vehicle-width-direction outer side is formed at an intermediate portion in the up-down direction of the outer surface portion 31a such that the horizontal bead 31s extends in the front-rear direction from a rear end of the linear portion 30a to the vicinity of its front end. As shown in FIGS. 8 to 10, the horizontal bead 31s is formed in a substantially rectangular cross-sectional shape. The vertical dimension of the horizontal bead 31s is set within a range of 15% to 30% of the vertical dimension of a rear end of the reinforcement outer member 31. In the present embodiment, the vertical dimension of the horizontal bead 31s is set to about 20% of the vertical dimension of the rear end of the reinforcement outer member 31. As shown in FIGS. 7 to 10, the horizontal bead 31s is configured such that its cross-sectional area (amount of protrusion toward the vehicle-width-direction outer side) reduces toward the front side, or in other words, a line L connecting the cross-sectional center of gravity of the horizontal bead 31s is shifted to the vehicle-width-direction inner side as it goes toward the front side.

As such, the cross-sectional area of the horizontal bead 31s reduces toward the front side, which means that longitudinal rigidity of the reinforcement outer member 31 is lowered toward the front side. Thus, a deformation facilitating portion is constituted that allows stress to concentrate on a connecting portion between the reinforcement outer member 31 and the pillar outer member 21 of the hinge pillar 20 in the event of a small overlap collision. Also, as the line L connecting the cross-sectional center of gravity of the horizontal bead 31s is configured to shift to the vehicle-width-direction inner side as it goes toward the front side, stress passing through the reinforcement outer member 31 is converted into stress that goes toward the vehicle-width-direction inner side.

The first vertical bead 31t is formed such that it extends in the up-down direction in a region frontward of the horizontal bead 31s and is depressed toward the vehicle-width-direction inner side. The front-rear dimension of the first vertical bead 31t is set larger than the front-rear dimension of the second vertical bead 31u and smaller than the vertical dimension of the horizontal bead 31s. This allows the reinforcement outer member 31 to undergo inward breakage deformation in the vehicle width direction around the first vertical bead 31t in the event of a frontal collision, enabling absorption of impact energy.

The second vertical bead 31u is formed such that it extends upward from an intermediate portion in the front-rear direction of the horizontal bead 31s to the upper wall 31b and protrudes toward the vehicle-width-direction outer side. In side view, the second vertical bead 31u is positioned above the distal end member 23 and substantially at the same position as the distal end member 23 in the front-rear direction, as shown in FIG. 3. This allows stress passing rearward through the reinforcement outer member 31 to concentrate on the second vertical bead 31u in the event of a small overlap collision and thus increases, in cooperation with the distal end member 23, stress components that act on the reinforcement outer member 31 and go toward the vehicle-width-direction inner side.

Figure 4:
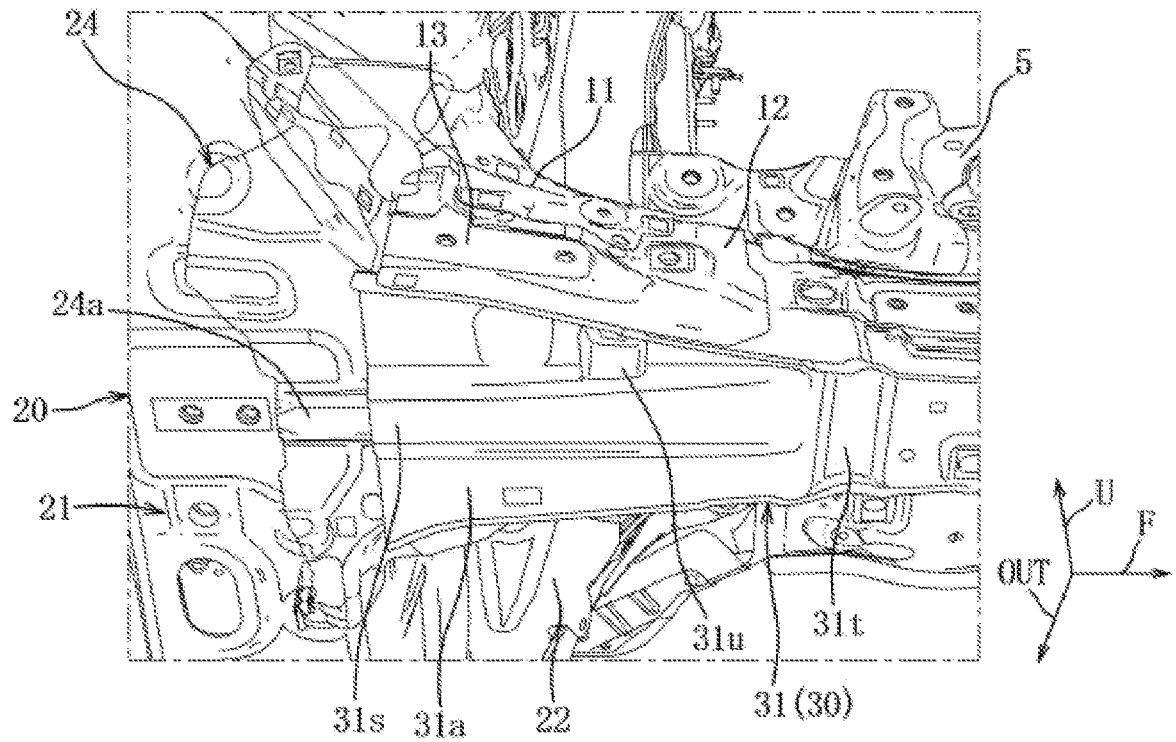
FIG. 4. is a perspective view of vehicle-body portions shown in FIG. 3 when they are viewed from above on the vehicle-width-direction outer side.
Figure 5:
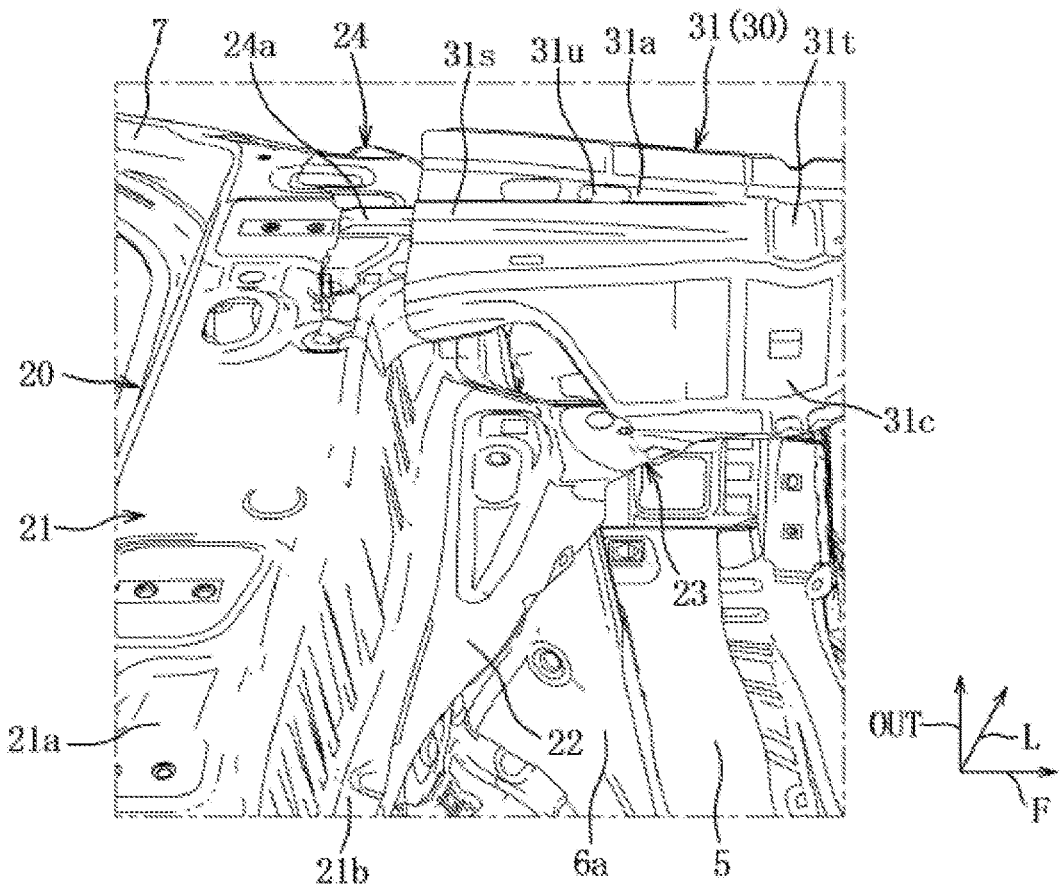
FIG. 5. is a perspective view of the vehicle-body portions shown in FIG. 3 when they are viewed from below on the vehicle-width-direction outer side.
Figure 6:
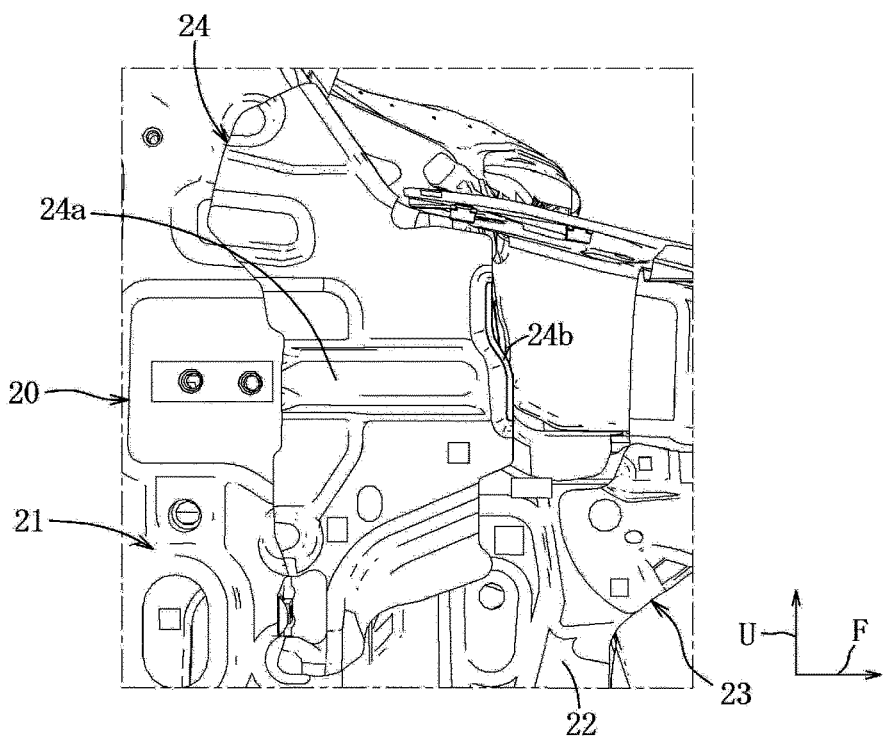
FIG. 6 illustrates the vehicle-body portions shown in FIG. 3 with an apron reinforcement removed.
Figure 7:
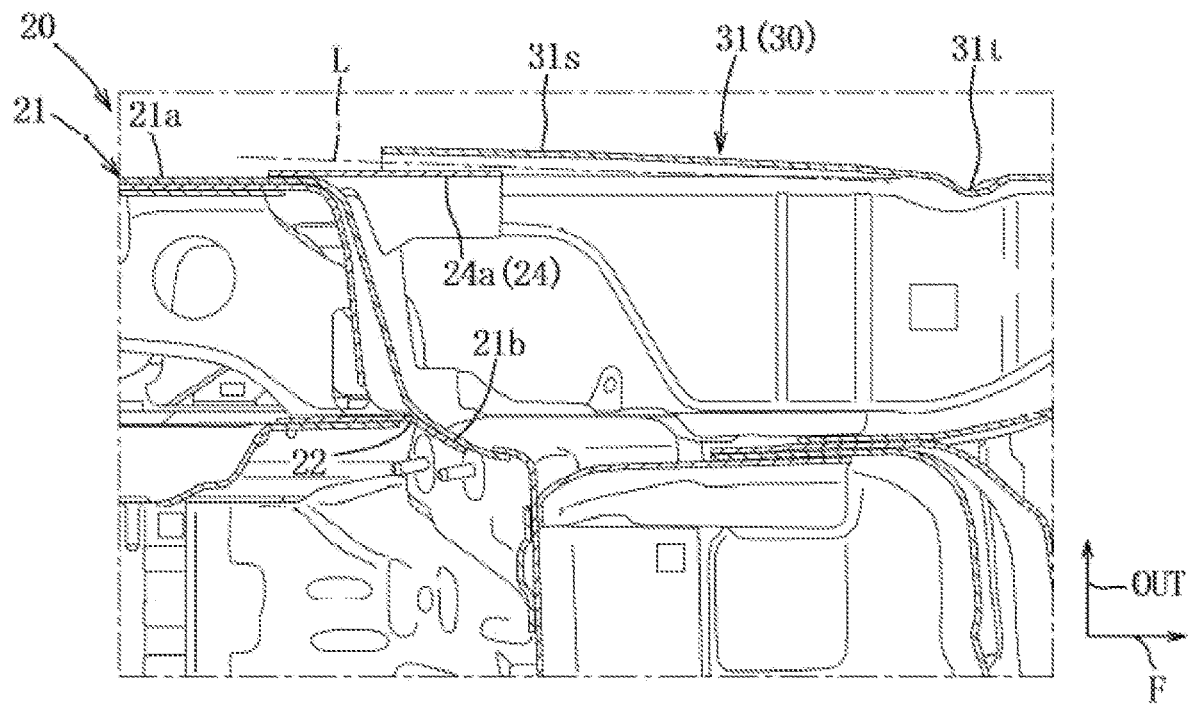
FIG. 7 is a sectional view taken along a line VII-VII in FIG. 3.

As shown in FIGS. 2 to 4, an inner panel 11, a hinge reinforcement 12, and a hinge bracket 13 are joined to an upper end of the upper wall 31b. The inner panel 11 connects the dash upper panel 3a and the upper end of the upper wall 31b. The inner panel 11 is provided from a rear end of the upper wall 31b to a position in the front-rear direction corresponding to the second vertical bead 31u. In the present embodiment, an outer front end of the inner panel 11 is disposed frontward of the rear end of the second vertical bead 31u and rearward of the front end of the second vertical bead 31u.

As shown in FIGS. 8 to 11, the hinge reinforcement 12 is a member for fixing a hinge (not shown) of a bonnet to the upper extended portion 22b and the upper wall 31b. The hinge reinforcement 12 is joined to a lower portion of the inner panel 11 and provided from the rear end of the upper wall 31b to a position in the front-rear direction corresponding to a position in the vicinity of the front end of the horizontal bead 31s.

The hinge bracket 13 is a member for mounting the hinge of the bonnet to an upper portion of the hinge reinforcement 12. A front end of the hinge bracket 13 is disposed frontward of the rear end of the second vertical bead 31u and rearward of the outer front end of the inner panel 11. This allows downward stress acting on the upper wall 31b, which corresponds to a region frontward of the hinge bracket 13, to be supported by the second vertical bead 31u in the event of a small overlap collision, preventing downward buckling of the upper wall 31b.

Figure 20:
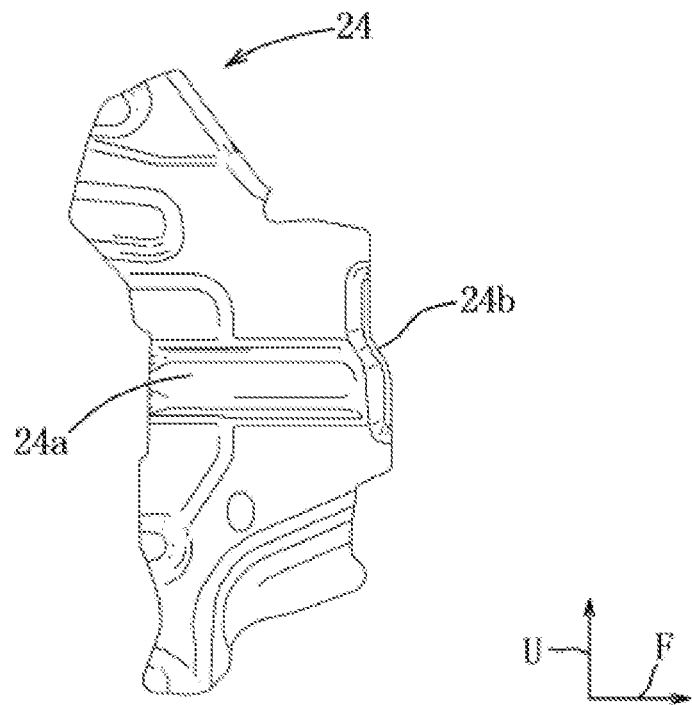
FIG. 20 is a side view of a cowl side reinforcement.
Figure 21:
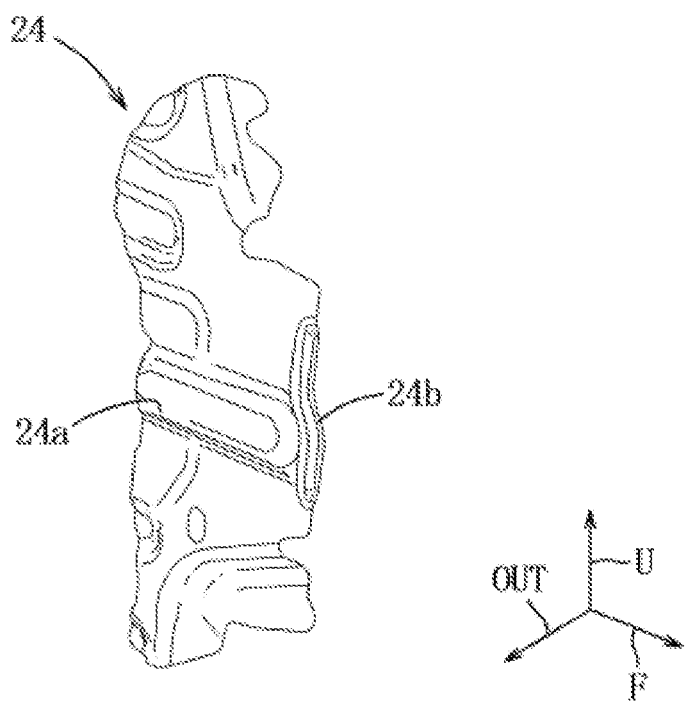
FIG. 21 is a perspective view of the cowl side reinforcement.
Figure 22:
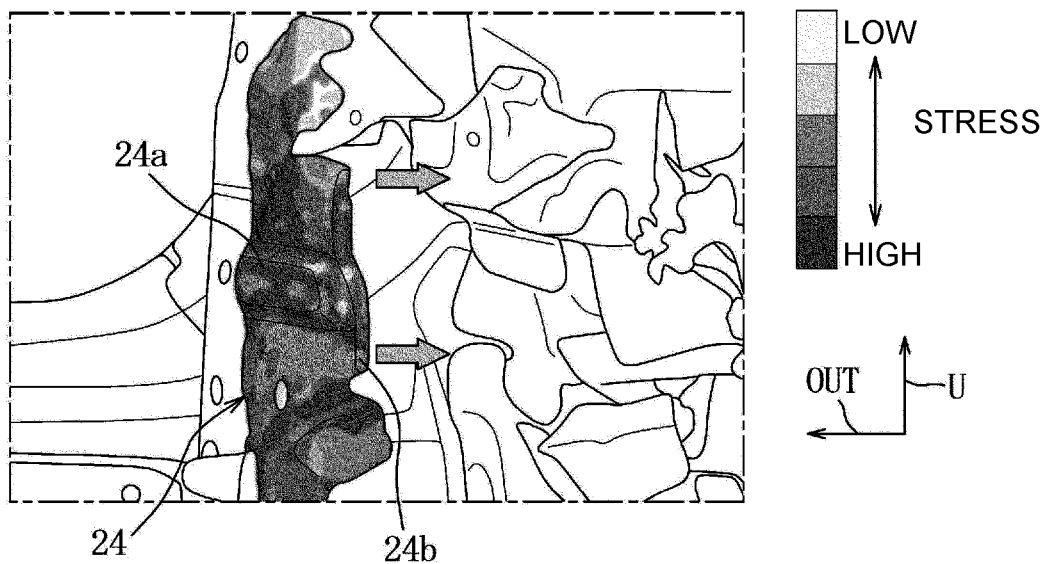
FIG. 22 illustrates the cowl side reinforcement during its deformation.

As shown in FIGS. 1 to 6 and 8, the reinforcement outer member 31 is connected to the pillar outer member 21 via a cowl side reinforcement 24 (cowl side reinforcement). The cowl side reinforcement 24 is joined to the pillar outer member 21 by spot welding such that the cowl side reinforcement 24 partially overlaps a right end of the upper hinge mounting portion. The cowl side reinforcement 24 is also joined to an upper side portion of the front pillar 7. As shown in FIGS. 20 and 21, the cowl side reinforcement 24 includes a horizontal bead 24a and a vertical bead 24b (up-down direction bead).

The horizontal bead 24a protruding toward the vehicle-width-direction outer side is formed at an intermediate portion in the up-down direction of the cowl side reinforcement 24 such that the horizontal bead 24a extends in the front-rear direction from a rear end of the cowl side reinforcement 24 to the vicinity of its front end. As shown in FIG. 8, the horizontal bead 24a is formed in a substantially rectangular cross-sectional shape. When the cowl side reinforcement 24 is joined to the reinforcement outer member 31, the horizontal bead 24a partially overlaps the horizontal bead 31s from the vehicle-width-direction inner side.

The vertical bead 24b is formed in a region frontward of the horizontal bead 24a such that the vertical bead 24b extends in the up-down direction from a lower side of the horizontal bead 24a to the vicinity of its upper end and is depressed toward the vehicle-width-direction inner side. When stress that has passed rearward through the reinforcement outer member 31 (horizontal bead 31s) is transmitted to the cowl side reinforcement 24 in the event of a small overlap collision, the stress is dispersed in the up-down direction along the vertical bead 24b. Thus, the vertical bead 24b can cause the stress that has passed rearward through the reinforcement outer member 31 to act on the vehicle-width-direction inner side over a wide range in the up-down direction, as indicated by arrows in FIG. 22, and this in turn can induce inward breakage deformation of the reinforcement outer member 31 at its rear end portion.

Figure 23:
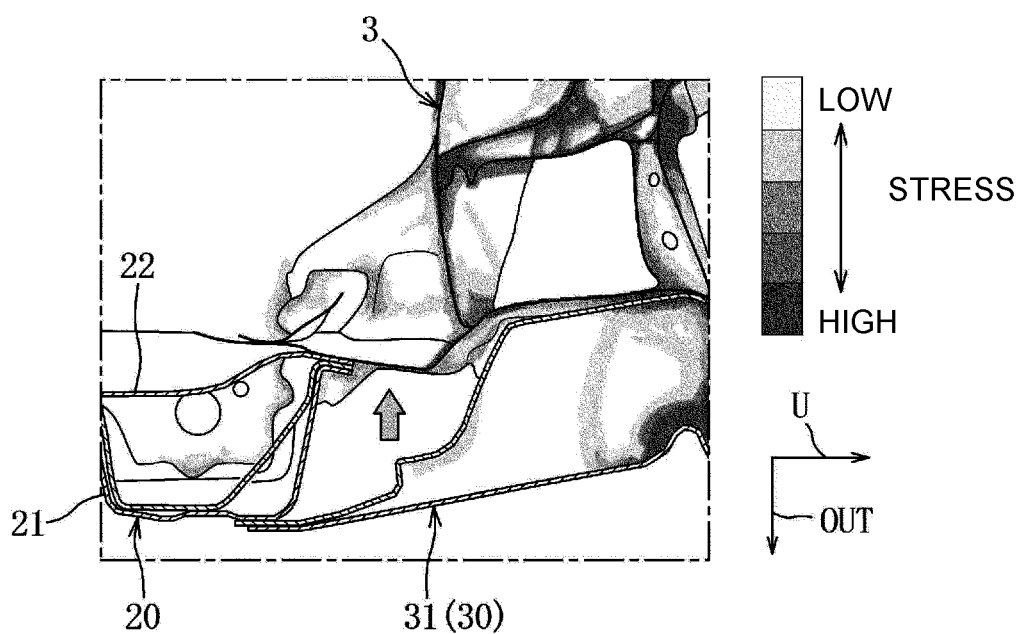
FIG. 23 illustrates a hinge pillar and the apron reinforcement after their inward breakage deformation.
Figure 24A:
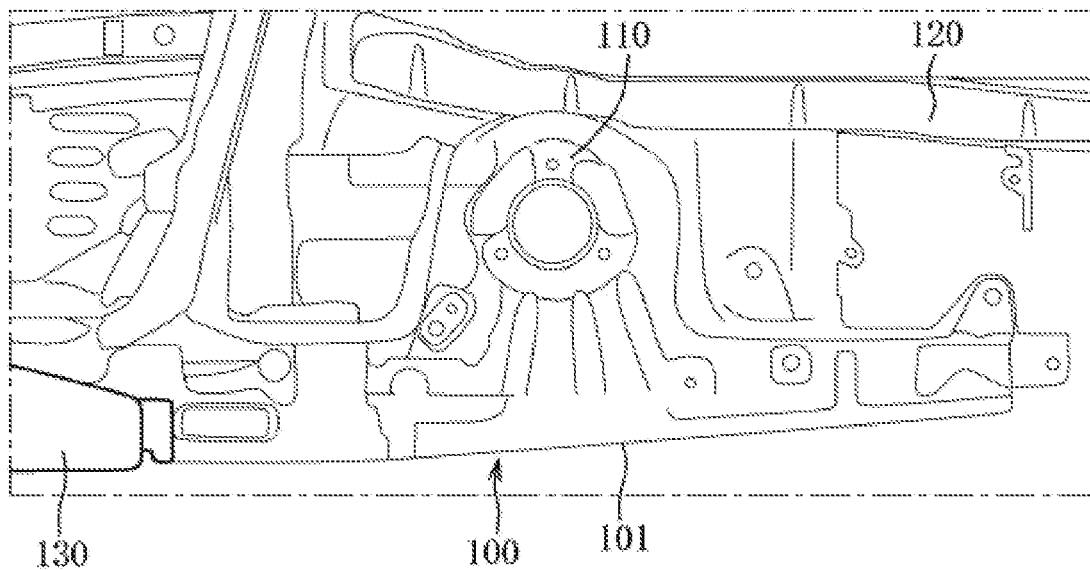
FIGS. 24A and 24B are left bottom views of a conventional vehicle.
Figure 24B:
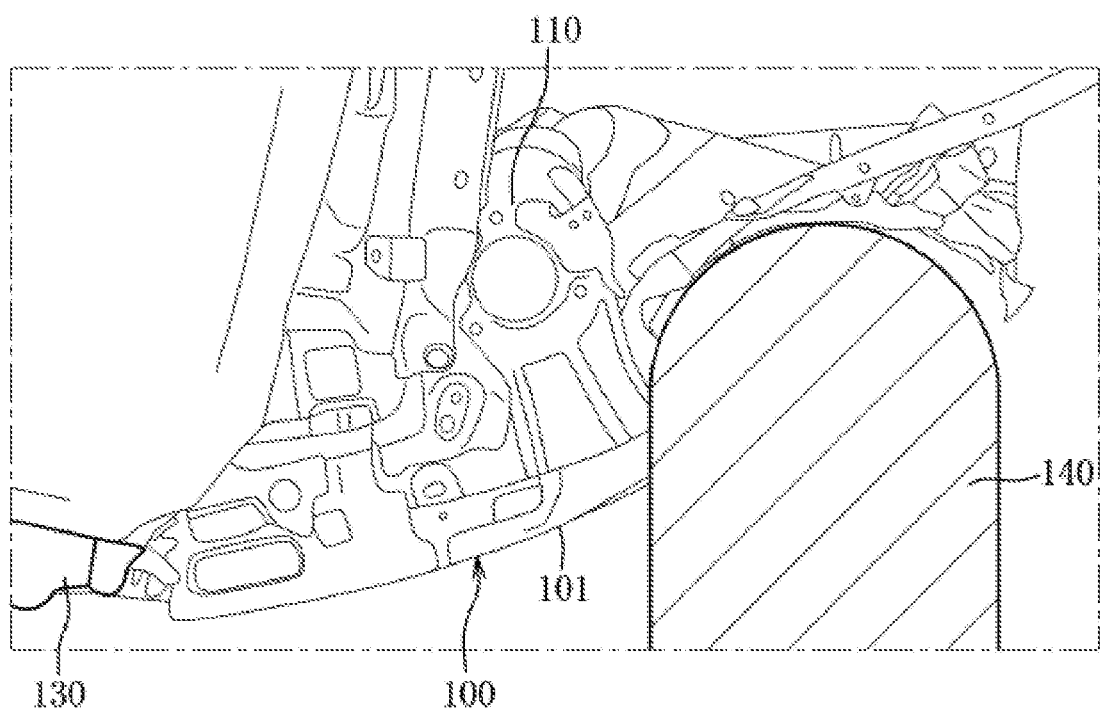
Figure 25A:
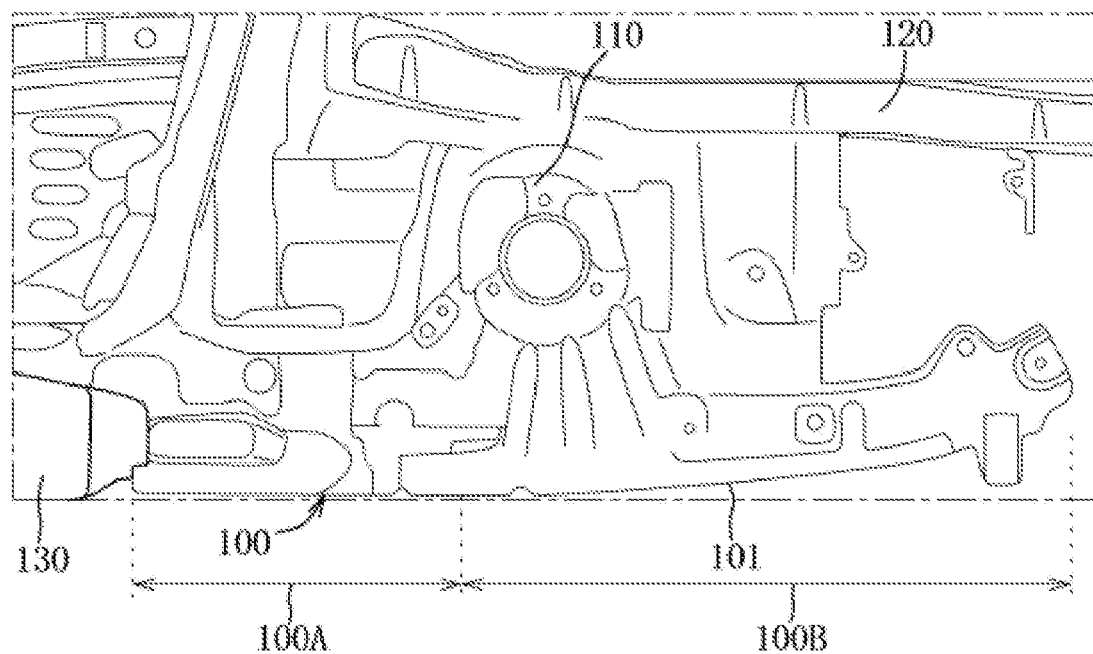
FIGS. 25A and 25B are left bottom views of a vehicle with widened wheel wells.
Figure 25B:
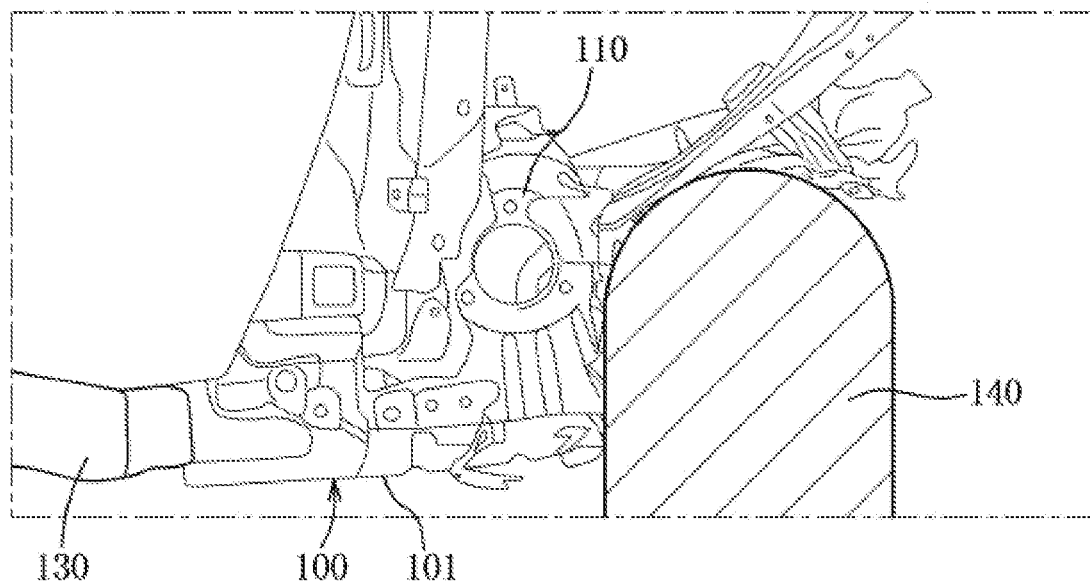

Below a description will be given of functions and effects of the front vehicle-body structure of the vehicle V according to the embodiment of the present disclosure. In the present embodiment, the reinforcement outer member 31 (apron reinforcement 30) includes the linear portion 30a that extends linearly in the vehicle front-rear direction from the rear end of the reinforcement outer member 31 connected to the hinge pillar 20 to the intermediate portion of the reinforcement outer member 31. Consequently, the wheel well 6 can be widened to the vehicle-width-direction outer side, and a large diameter wheel can be mounted. On the outer surface portion 31a positioned on the vehicle-width-direction outer side of the linear portion 30a, the horizontal bead 31s is provided as the deformation facilitating portion facilitating deformation toward the inside of the vehicle body and having a reduced longitudinal rigidity toward the front side in the vehicle front-rear direction. This allows stress to concentrate on the connecting portion between the reinforcement outer member 31 and the hinge pillar 20 in the event of a small overlap collision without needing to increase the plate thickness of the hinge pillar 20 or adding a reinforcement member, and as shown in FIG. 23, the apron reinforcement 30 can be controlled to break inward to the vehicle-width-direction inner side essentially without involving retraction of the hinge pillar 20.

The deformation facilitating portion includes the horizontal bead 31s extending in the vehicle front-rear direction, and the horizontal bead 31s is configured such that its cross-section reduces toward the front side in the vehicle front-rear direction and the cross-sectional center of gravity shifts to the vehicle-width-direction inner side as it goes toward the front side in the vehicle front-rear direction. This allows stress to be transmitted to the connecting portion between the reinforcement outer member 31 and the hinge pillar 20 without requiring an additional member and without causing buckling of the outer surface portion 31a of the reinforcement outer member 31 (apron reinforcement 30) that involves out-of-plane deformation. Additionally, in passing the stress rearward through the reinforcement outer member 31, stress components that go toward the vehicle-width-direction inner side can be generated.

The deformation facilitating portion includes the second vertical bead 31u that extends in the up-down direction from the intermediate portion in the vehicle front-rear direction of the horizontal bead 31s and protrudes toward the vehicle-width-direction outer side. Thus, by concentrating the stress passing rearward through the reinforcement outer member 31 on the second vertical bead 31u, stress components that act on the reinforcement outer member 31 and go toward the vehicle-width-direction inner side can be actively increased.

The reinforcement outer member 31 (apron reinforcement 30) includes, on its upper end, the hinge bracket 13 for fixing the bonnet hinge, and the second vertical bead 31u extends upward from the upper end of the horizontal bead 31s to the position near the front end of the hinge bracket 13. This can increase the stress components that act on the reinforcement outer member 31 (apron reinforcement 30) and go toward the vehicle-width-direction inner side, while restraining downward buckling of the region near the front end of the hinge bracket 13.

The hinge pillar 20 includes the pillar outer member 21 that is disposed on the vehicle-width-direction outer side and the pillar inner member 22 that forms, jointly with the pillar outer member 21, a closed cross-section extending in the up-down direction. The pillar inner member 22 includes the body 22a that has a surface substantially perpendicular to the vehicle width direction and the distal end member 23 that is located frontward of the body 22a and joined to the reinforcement outer member 31 and the body 22a, and the fragile portion 23e is formed at the position near the connecting portion between the body 22a and the distal end member 23. This can facilitate inward breakage deformation of the outer surface portion 31a from the vehicle-width-direction inner side by permitting deformation toward the vehicle-width-direction inner side while ensuring mounting rigidity of the reinforcement outer member 31 via the distal end member 23.

The fragile portion 23e is created by a strength difference between the material strength of the body 22a and the material strength of the distal end member 23. As such, the fragile portion 23e can be formed by the material strength difference between the body 22a and the distal end member 23.

The distal end member 23 includes, at the position frontward of the fragile portion 23e in the vehicle front-rear direction, the protrusion 23c that protrudes toward the vehicle-width-direction inner side. Hence, by using deformation of the protrusion 23c, the fragile portion 23e can be induced to bend toward the vehicle-width-direction inner side in the event of a small overlap collision.

The front vehicle-body structure of a vehicle includes the cowl side reinforcement 24 connected to the pillar outer member 21 and the reinforcement outer member 31, and the cowl side reinforcement 24 is provided at its front end with the vertical bead 24b protruding toward the vehicle-width-direction inner side and extending in the up-down direction. This up-down direction bead can cause the stress passing rearward through the reinforcement outer member 31 to act over a wide range in the up-down direction, facilitating inward breakage deformation of the outer surface portion 31a toward the vehicle-width-direction inner side.

Some partial modifications to the above embodiments will be described below. In the above embodiment, the deformation facilitating portion is described, by way of example, such that it is formed of the horizontal bead 31s having a rectangular cross-sectional shape whose cross-sectional area reduces toward the front side. However, the deformation facilitating portion does not necessarily have to be of a rectangular cross-sectional shape, and may be of an arc cross-sectional shape or a polygonal shape. Also, the deformation facilitating portion does not necessarily have to be a single part, and may be composed of two or more beads.

In the above embodiment, the second vertical bead 31u is described, by way of example, such that it is formed to extend upward from the intermediate portion of the horizontal bead 31s. However, the second vertical bead 31u may be formed to extend downward from the intermediate portion of the horizontal bead 31s. Still alternatively, both of the second vertical bead extending upward from the intermediate portion of the horizontal bead 31s and the second vertical bead extending downward from the intermediate portion of the horizontal bead 31s may be provided.

In the above embodiment, the fragile portion 23e of the distal end member 23 is described, by way of example, such that it is created by material strength (tensile strength) difference. However, the fragile portion may be structurally formed. For example, by forming a thin portion or a slit portion at a position rearward of the protrusion 23d and frontward of the connecting portion 23c, inward breakage deformation can take place at that fragile portion regardless of the material strength of the distal end member 23 and the pillar inner member 22. Still alternatively, the fragile portion may be provided with a bead protruding toward the vehicle-width-direction outer side.

In addition, it will be understood by those skilled in the art that various modifications can be made to the above embodiment and also various combinations of embodiments are possible without departing from the scope of the present disclosure. The present disclosure encompasses such modified embodiments.

What is claimed is:
1. A front vehicle-body structure of a vehicle, comprising:
a pair of right and left apron reinforcements extending in a vehicle front-rear direction; and
a pair of right and left hinge pillars respectively connected to rear ends of the pair of apron reinforcements, wherein
the apron reinforcement includes a linear portion extending linearly in the vehicle front-rear direction from a rear end of the apron reinforcement connected to the hinge pillar to an intermediate portion of the apron reinforcement,
a deformation facilitating portion to facilitate deformation toward an inside of a vehicle body is disposed on an outer surface portion positioned on a vehicle-width-direction outer side of the linear portion, the deformation facilitating portion having a reduced longitudinal rigidity toward a front side in the vehicle front-rear direction,
the deformation facilitating portion includes a horizontal bead extending in the vehicle front-rear direction,
the horizontal bead is configured such that a cross-section thereof reduces toward the front side in the vehicle front-rear direction and a cross-sectional center of gravity thereof shifts to the vehicle-width-direction inner side as the center of gravity goes toward the front side in the vehicle front-rear direction, and
the deformation facilitating portion includes a vertical bead extending in an up-down direction from an inter- mediate portion in the vehicle front-rear direction of the horizontal bead and protruding toward the vehicle-width-direction outer side.

2. The front vehicle-body structure of a vehicle according to claim 1, wherein
the apron reinforcement includes, on an upper end thereof, a hinge bracket for fixing a bonnet hinge, and
the vertical bead extends upward from an upper end of the horizontal bead to a position near a front end of the hinge bracket.

3. The front vehicle-body structure of a vehicle according to claim 2, wherein
the hinge pillar includes a hinge pillar outer member disposed on the vehicle-width-direction outer side and a hinge pillar inner member forming, jointly with the hinge pillar outer member, a closed cross-section extending in an up-down direction,
the hinge pillar inner member includes a body having a surface substantially perpendicular to a vehicle width direction and a distal end located frontward of the body and joined to the apron reinforcement and the body, and
a fragile portion is disposed at a position near a connecting portion between the body and the distal end.

4. The front vehicle-body structure of a vehicle according to claim 3, wherein
the fragile portion is created by a strength difference between a material strength of the body and a material strength of the distal end.

5. The front vehicle-body structure of a vehicle according to claim 4, wherein
the distal end includes a protrusion at a position frontward of the fragile portion in the vehicle front-rear direction, the protrusion protruding toward a vehicle-width-direction inner side.

6. The front vehicle-body structure of a vehicle according to claim 5, wherein
the front vehicle-body structure comprises a cowl side reinforcement connected to the hinge pillar outer member and the apron reinforcement, and
an up-down direction bead is located at a front end of the cowl side reinforcement, the up-down direction bead protruding toward a vehicle-width-direction inner side and extending in the up-down direction.

7. A front vehicle-body structure of a vehicle, comprising:
a pair of right and left apron reinforcements extending in a vehicle front-rear direction; and
a pair of right and left hinge pillars respectively connected to rear ends of the pair of apron reinforcements, wherein
the apron reinforcement includes a linear portion extending linearly in the vehicle front-rear direction from a rear end of the apron reinforcement connected to the hinge pillar to an intermediate portion of the apron reinforcement,
a deformation facilitating portion to facilitate deformation toward an inside of a vehicle body is disposed on an outer surface portion positioned on a vehicle-width-direction outer side of the linear portion, the deformation facilitating portion having a reduced longitudinal rigidity toward a front side in the vehicle front-rear direction,
the hinge pillar includes a hinge pillar outer member disposed on the vehicle-width-direction outer side and a hinge pillar inner member forming, jointly with the hinge pillar outer member, a closed cross-section extending in an up-down direction,
the hinge pillar inner member includes a body having a surface substantially perpendicular to a vehicle width direction and a distal end located frontward of the body and joined to the apron reinforcement and the body, and
a fragile portion is disposed at a position near a connecting portion between the body and the distal end.

8. The front vehicle-body structure of a vehicle according to claim 7, wherein
the fragile portion is created by a strength difference between a material strength of the body and a material strength of the distal end.

9. The front vehicle-body structure of a vehicle according to claim 7, wherein
the distal end includes a protrusion at a position frontward of the fragile portion in the vehicle front-rear direction, the protrusion protruding toward a vehicle-width-direction inner side.

10. The front vehicle-body structure of a vehicle according to claim 8, wherein
the distal end includes a protrusion at a position frontward of the fragile portion in the vehicle front-rear direction, the protrusion protruding toward a vehicle-width-direction inner side.

11. The front vehicle-body structure of a vehicle according to claim 7, wherein
the front vehicle-body structure comprises a cowl side reinforcement connected to the hinge pillar outer member and the apron reinforcement, and
an up-down direction bead is located at a front end of the cowl side reinforcement, the up-down direction bead protruding toward a vehicle-width-direction inner side and extending in the up-down direction.

12. The front vehicle-body structure of a vehicle according to claim 8, wherein
the front vehicle-body structure comprises a cowl side reinforcement connected to the hinge pillar outer member and the apron reinforcement, and
an up-down direction bead is located at a front end of the cowl side reinforcement, the up-down direction bead protruding toward a vehicle-width-direction inner side and extending in the up-down direction.

13. The front vehicle-body structure of a vehicle according to claim 9, wherein
the front vehicle-body structure comprises a cowl side reinforcement connected to the hinge pillar outer member and the apron reinforcement, and
an up-down direction bead is located at a front end of the cowl side reinforcement, the up-down direction bead protruding toward a vehicle-width-direction inner side and extending in the up-down direction.

14. The front vehicle-body structure of a vehicle according to claim 1, wherein
the hinge pillar includes a hinge pillar outer member disposed on the vehicle-width-direction outer side and a hinge pillar inner member forming, jointly with the hinge pillar outer member, a closed cross-section extending in an up-down direction,
the hinge pillar inner member includes a body having a surface substantially perpendicular to a vehicle width direction and a distal end located frontward of the body and joined to the apron reinforcement and the body, and
a fragile portion is disposed at a position near a connecting portion between the body and the distal end.

15. The front vehicle-body structure of a vehicle according to claim 14, wherein the fragile portion is created by a strength difference between a material strength of the body and a material strength of the distal end.

16. The front vehicle-body structure of a vehicle according to claim 14, wherein
the distal end includes a protrusion at a position frontward of the fragile portion in the vehicle front-rear direction, the protrusion protruding toward a vehicle-width-direction inner side.

17. The front vehicle-body structure of a vehicle according to claim 14, wherein
the front vehicle-body structure comprises a cowl side reinforcement connected to the hinge pillar outer member and the apron reinforcement, and
an up-down direction bead is located at a front end of the cowl side reinforcement, the up-down direction bead protruding toward a vehicle-width-direction inner side and extending in the up-down direction.

* * * * *